United States Patent
Mauger

(10) Patent No.: US 6,222,843 B1
(45) Date of Patent: Apr. 24, 2001

(54) PROVIDING SERVICES IN A TELECOMMUNICATIONS NETWORK

(75) Inventor: Roy Harold Mauger, Radlett (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/952,677

(22) PCT Filed: Sep. 25, 1996

(86) PCT No.: PCT/GB96/02378

§ 371 Date: Nov. 12, 1997

§ 102(e) Date: Nov. 12, 1997

(87) PCT Pub. No.: WO97/13389

PCT Pub. Date: Apr. 10, 1997

(30) Foreign Application Priority Data

Sep. 29, 1995 (GB) .................................................. 9519813

(51) Int. Cl.[7] .................................................. H04J 12/56
(52) U.S. Cl. .................. 370/397; 370/466; 370/467; 370/522
(58) Field of Search .................... 370/395, 396, 370/398, 400, 401–405, 409, 410, 426, 420, 465, 466, 467, 468, 522, 524, 353; 709/249; 379/207, 219, 230, 234

(56) References Cited

U.S. PATENT DOCUMENTS

| | | | |
|---|---|---|---|
| 5,182,550 | * 1/1993 | Masuda et al. | 379/409 |
| 5,610,910 | * 3/1997 | Focsaneanu et al. | 370/351 |
| 5,623,488 | * 4/1997 | Svennevik et al. | 370/360 |
| 5,894,477 | * 4/1999 | Brueekheimer et al. | 370/353 |
| 5,917,824 | * 6/1999 | Brueekheimer et al. | 370/397 |
| 6,002,689 | * 12/1999 | Christie et al. | 370/401 |
| 6,081,525 | * 6/2000 | Christie et al. | 370/392 |
| 6,108,341 | * 8/2000 | Christie | 370/410 |
| 6,115,380 | * 9/2000 | Christie et al. | 370/392 |

* cited by examiner

*Primary Examiner*—Seema S. Rao
(74) *Attorney, Agent, or Firm*—Lee, Mann, Smith, McWilliams, Sweeney & Ohlson

(57) ABSTRACT

An open Services architecture for inter working narrow band services with equivalent broad band services delivers services on both the existing narrow band network and a future broad band network based on flexible signalling connections. The architecture incorporates an adaptive grooming router providing a fully interconnected backbone network function providing connectivity between a plurality of multimedia access routers and a narrow band network. The multimedia access routers provide hub points where access units terminating ISDN basic access and primary rate access lines used for multimedia services are terminated.

12 Claims, 11 Drawing Sheets

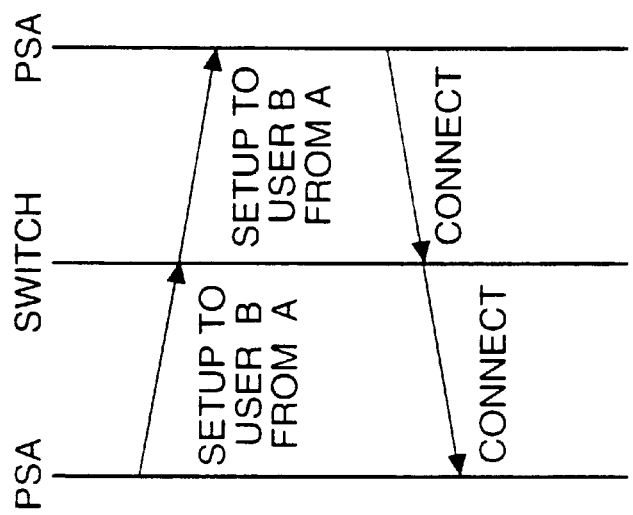
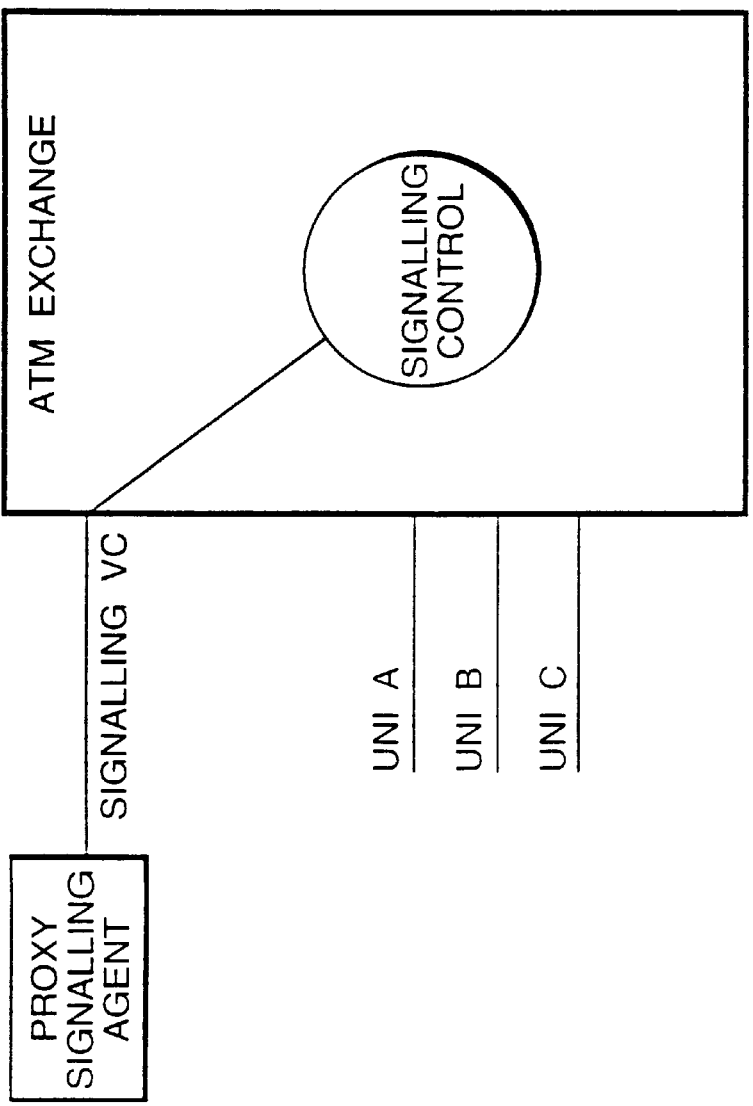
Fig.3.

PROVIDING SERVICES IN A TELECOMMUNICATIONS NETWORK

This invention relates to telecommunications networks and in particular to the provision of services in such networks.

BACKGROUND OF THE INVENTION

Within the Telecommunications industry there are a number of initiatives to unbundle telecommunications services from the switches which provide them. Currently this is embodied by Intelligent Networking (IN) whereby the switches are provided with a number of trigger points at which they send a message to a Services Control Point in order to establish the next step in processing the call. Although IN has achieved many significant capabilities it is generally regarded as not being a sufficient separation of concerns to deal with the complexities that are now enabled by asynchronous transfer mode (ATM) networks.

In one approach to this problem, narrow band services are provided within the B-ISDN by mapping single 64 kb/s channels into ATM adaptation layer 1 (AAL1 VCs) and connecting them as switched VCs across the network, this creates the difficulty that the cell assembly delay of six milliseconds leads to a substantial revision of the network delay plans and a substantial increase in the requirement for echo cancellers, it also leads to the need for inter working between ISUP and B-ISUP signalling protocols leading to a substantial increase in the complexity of B-ISUP.

A general description of interworking of broad band and narrow band services using flexible signalling connections is given by Akihiro Sera et al. in Fujitsu Scientific and Technical Journal, Vol 28, No 2, Jan. 1, 1992, pages 150–159. This paper describes the enhancement of a digital switching system to evolve to a multi-service platform which can provide services for various media and interfaces.

SUMMARY OF THE INVENTION

An object of the invention is to minimise or to overcome this disadvantage.

It is a further object of the invention to provide an improved arrangement and method for providing narrow band services in an ATM communications network.

According to one aspect of the invention there is provided an open Services architecture for inter working narrow band services with equivalent broad band services in an ATM network and incorporating adaptation means whereby the services may be delivered on both the existing narrow band network and a future broad band network based on flexible signalling connections, the architecture incorporating an adaptive grooming router providing a fully interconnected backbone network function providing connectivity between a plurality of multimedia access routers and a narrow band network, wherein the multimedia access routers provide each a hub point where access units terminating ISDN basic access and primary rate access lines used for multimedia services are terminated.

According to another aspect of the invention there is provided a method of inter-working narrow band services with equivalent broad band services in an ATM network incorporating adaptation means whereby the services are capable of being delivered on both the existing narrow band network and a future broad band network based on flexible signalling connections, the method including providing a fully interconnected backbone network function providing connectivity between a plurality of multimedia access routers and a narrow band network, wherein the multimedia access routers provide each a hub point where access units terminating ISDN basic access and primary rate access lines used for multimedia services are terminated.

BRIEF DESCRIPTION OF THE DRAWINGS

An embodiment of the invention will now be described with reference to the accompanying drawings in which:

FIG. 3 illustrates a method of proxy signalling in the network of FIG. 1;

DESCRIPTION OF PREFERRED EMBODIMENT

Figure 1:
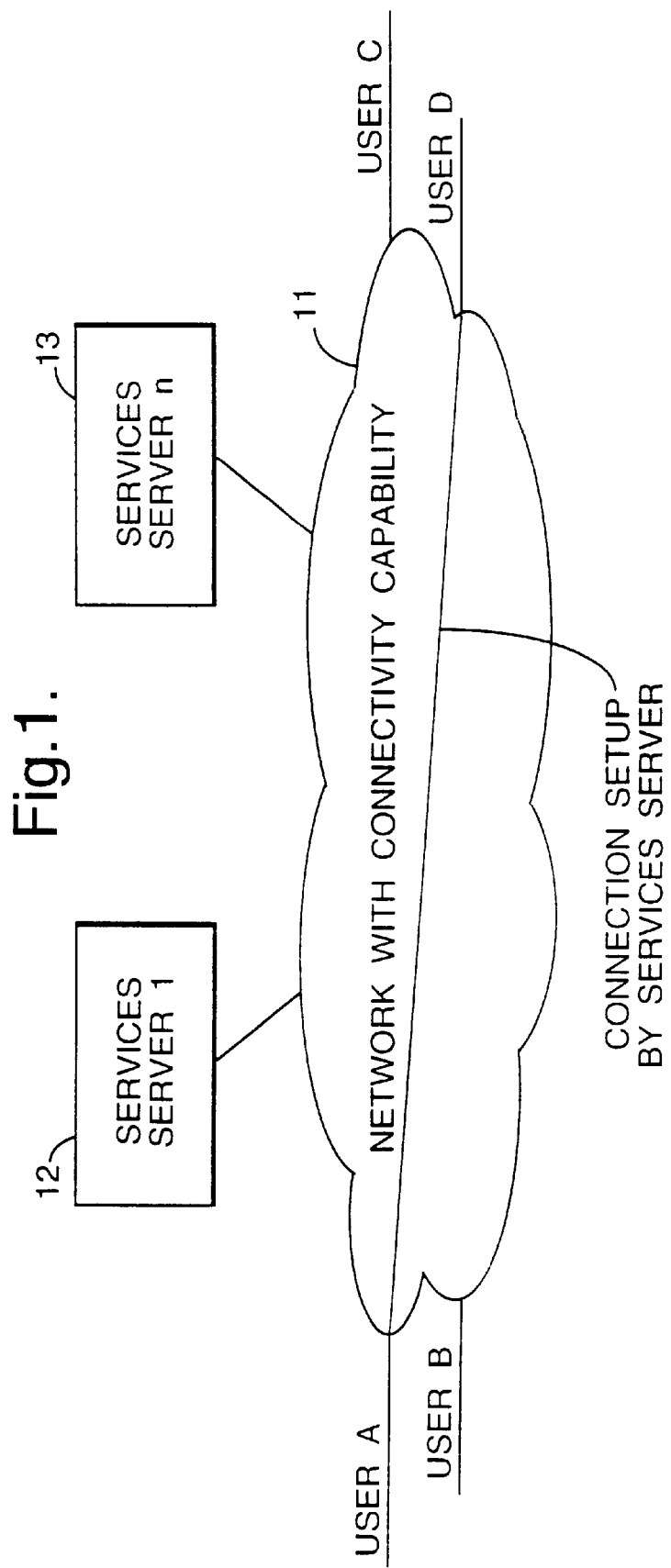
FIG. 1 is a schematic diagram of an ATM network incorporating an open services architecture.

Referring to FIG. 1, an open services architecture for an ATM network is illustrated in schematic form. In this architecture, users A, B, C, D are connected to a network 11 which, within its internal construction, provides the single service of connectivity. This connectivity is capable of being invoked by a number of computing devices or servers 12, 13 external to the network which exploit the connectivity capability in order to deliver the services requested by the user. Within the general concept the network may have the scale of a full size operator network, e.g. of tens of million of lines, and the servers are provided with an open control interface. The servers would typically be procured independently of the network and may change and evolve over time without the necessity of the base network needing to be upgraded. With the case of an ATM based network, connectivity may be for different types of traffic e.g. variable bit rate, constant bit rate or available bit rate, and may be provided at any capacity up to the limits of the network interfaces provided either as point to point or point to multipoint.

Figure 2:
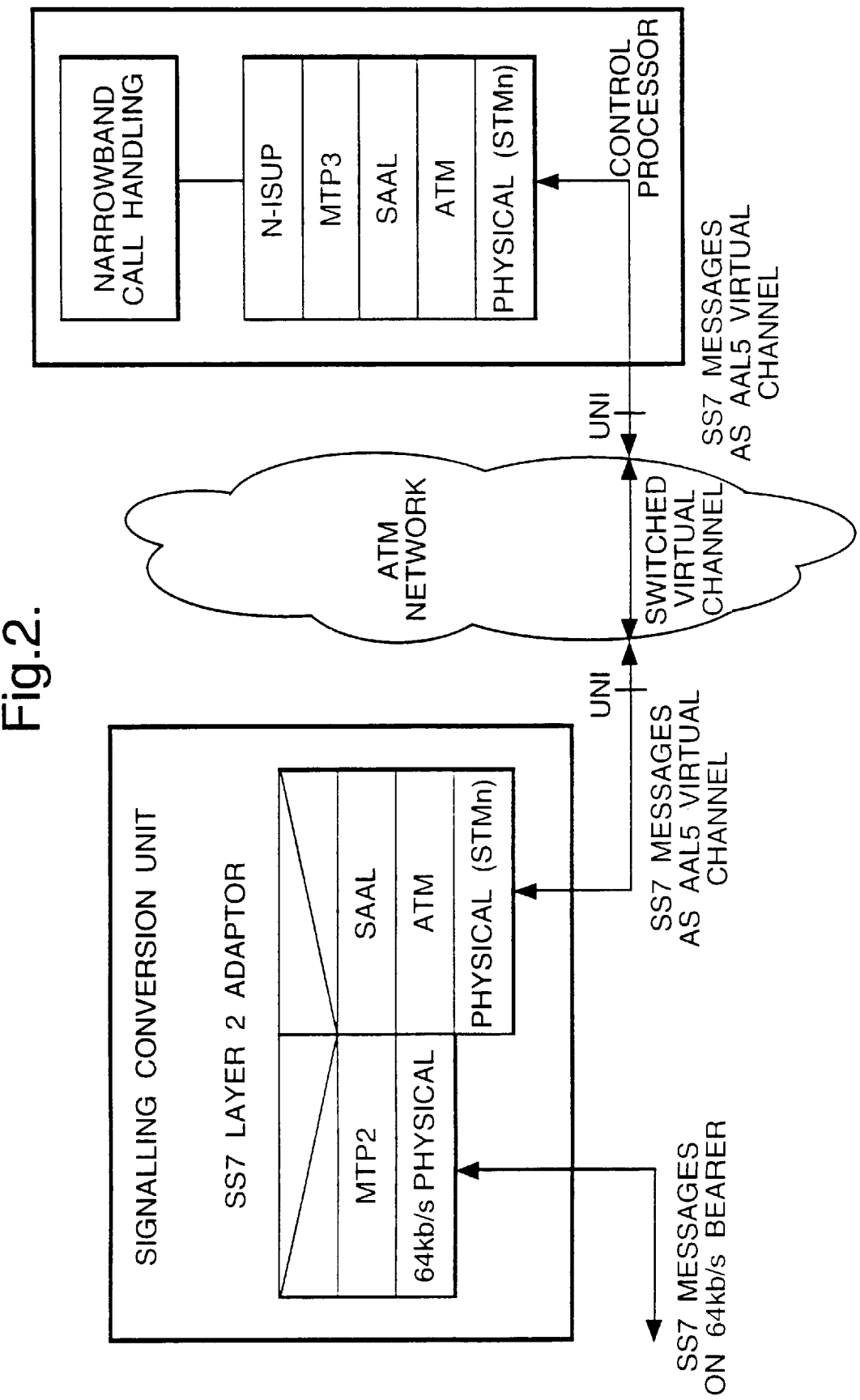
FIG. 2 illustrates the principle of switched signalling connections in the network of FIG. 1.

The principle of switched signalling connections is illustrated in FIG. 2 for the case of the narrow band Signalling System 7. A signalling conversion unit is provided in order to terminate the message transport part 2 (MTP2) and to transfer the information content of the message onto the broad band equivalent signalling ATM adaptation layer (SAAL). This is a well understood function illustrated as a layer 2 relay function using the conventional protocol stack layer diagrams. The SAAL is an enhancement of the variable bit rate AAL5 VC. Control Processors designed to work into an ATM network are provided with AAL5 hardware as a matter of course. It is therefore possible to switch the SS7 message stream across the ATM network as an AAL5 VC and to process the messages in any control processor which is provided with the required layers of SS7 signalling software, i.e. SAAL, MTP3, N-ISUP and an appropriate call handling package. This is a completely open environment as all of the SS7 software layers as well as the ATM hardware in the control processor are specified as ITU standards.

Figure 4:
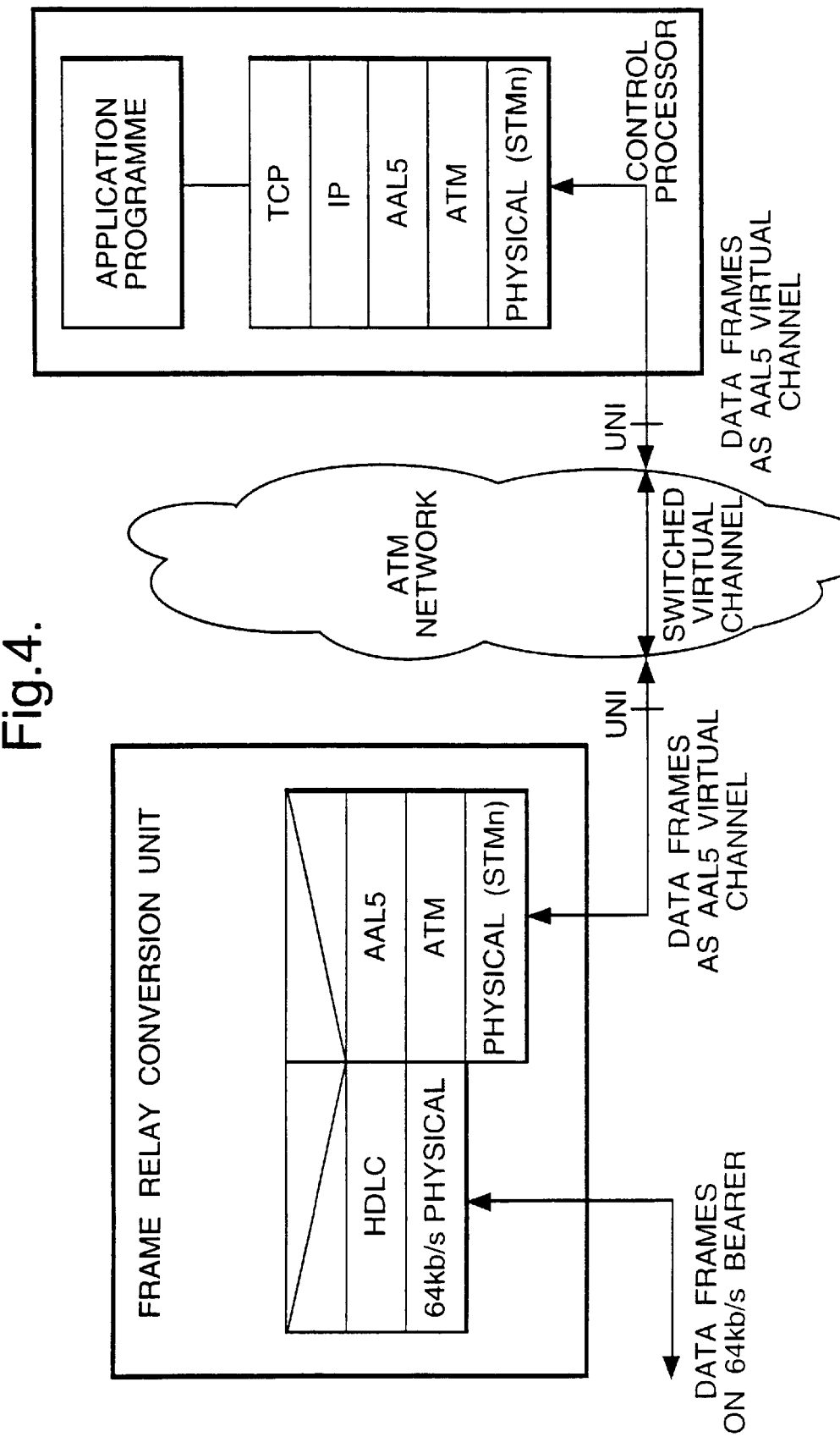
FIG. 4 illustrates a frame relay conversion arrangement for use with the network of FIG. 1.

The ATM Forum in its version 4.0 of its User Network Interface specification has introduced the capability for proxy signalling which is illustrated in FIG. 3. The principle is that a proxy signalling agent may be connected via any UNI of a switch or even on a different switch in the network and this agent will provide the signalling messages for calls to be placed on one or more client UNIs. The diagram of FIG. 4 illustrates a proxy signalling agent acting on behalf of UNI's A,B and C and also shows a message sequence chart for a connection between UNI A and UNI B.

High Level Datalink Control (HDLC) is a well known way of formatting a frame of data for transmission across a physical data link, it is the underlying adaptation layer for SS7 signalling and ISDN D-channel signalling as well as being the adaptation layer for the Frame Relay data service. FIG. 4 illustrates a conversion function between Frame Relay supported on 64 kb/s TDM channels and an ATM equivalent which is carried over AAL5 VC's, this is in fact identical hardware to that required by the Signalling Conversion Unit shown in FIG. 2 although different software is required. Following the conversion from the 64 kb/s to the AAL5 VC the Frame Relay data can be switched to an exactly similar Control Processor to that shown in FIG. 2 but in this case provided with software to process the underlying information content, this will typically require the Internet TCP/IP software together with some application programme.

Figure 5:
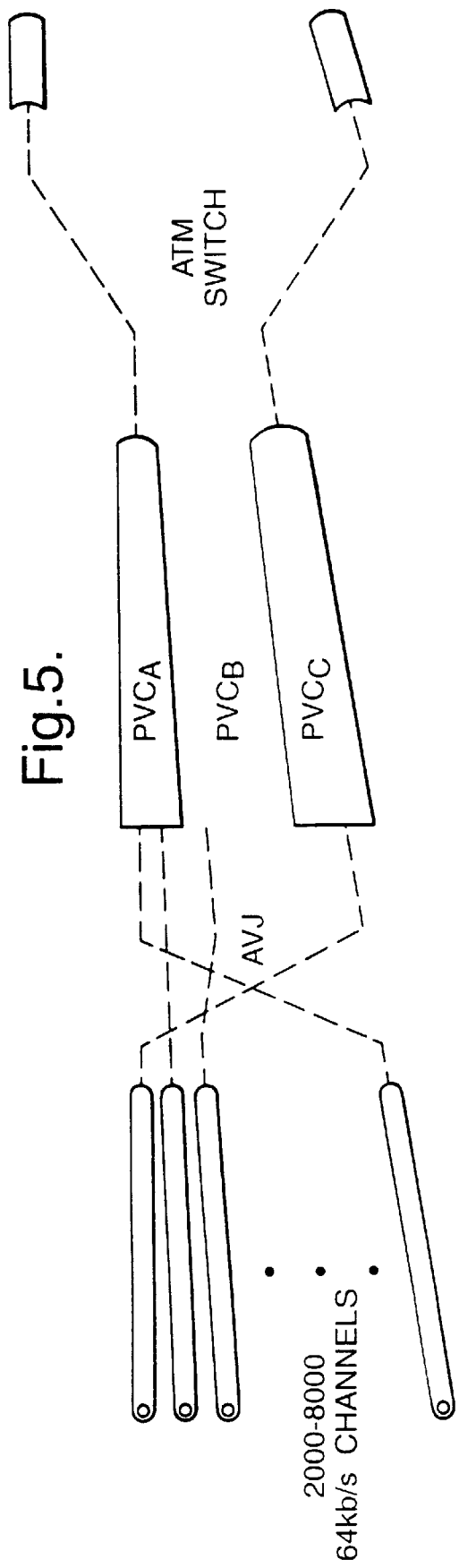
FIG. 5 shows the construction of an adaptive virtual junctor interconnection arrangement for use in the network of FIG. 1.

In our copending application No.9511944.2 the use of an Adaptive Virtual Junctor (AVJ) in order to achieve 64 kb/s switching on an ATM switch without incurring excessive cell assembly delay is described. This is illustrated in FIG. 5, the AVJ device is based on an enhancement to the ATM AAL1 Structured Data Transfer standard which allows a constant bit rate VC to carry an n×64 kb/s TDM stream with a pointer mechanism to identify the individual channels of the n×64 kb/s stream. The AVJ allows the number n of channels to be dynamically changed from n to (n+/− p) with the change being effected quickly enough to allow it to be performed to establish a new 64 kb/s channel for a call and to release at the end of the call. This modified adaptation layer is termed dynamic structured data transfer (DSDT). As illustrated in FIG. 5, multiple AVJs around an ATM switch are connected with a full mesh of DSDT VCs, with the AVJs negotiating to add 64 kb/s channels to their DSDT VCs on a call by call basis. This results in the behaviour of the ATM switch emulating that of a normal narrow band switch. This also resolves the two problems identified with the present B-ISDN solution for narrow band services, as there are n×64 kb/s channels in a VC and the cell assembly delay is negligible for n>=6. In addition, the VC carrying multiple calls is permanently established so that the signalling used for its establishment (B-ISUP) plays no part in the narrow band call establishment: the signalling for the narrow band call can remain as N-ISUP across the ATM network, so that an N-ISUP to B-ISUP to N-ISUP conversion process is not required.

Figure 6:
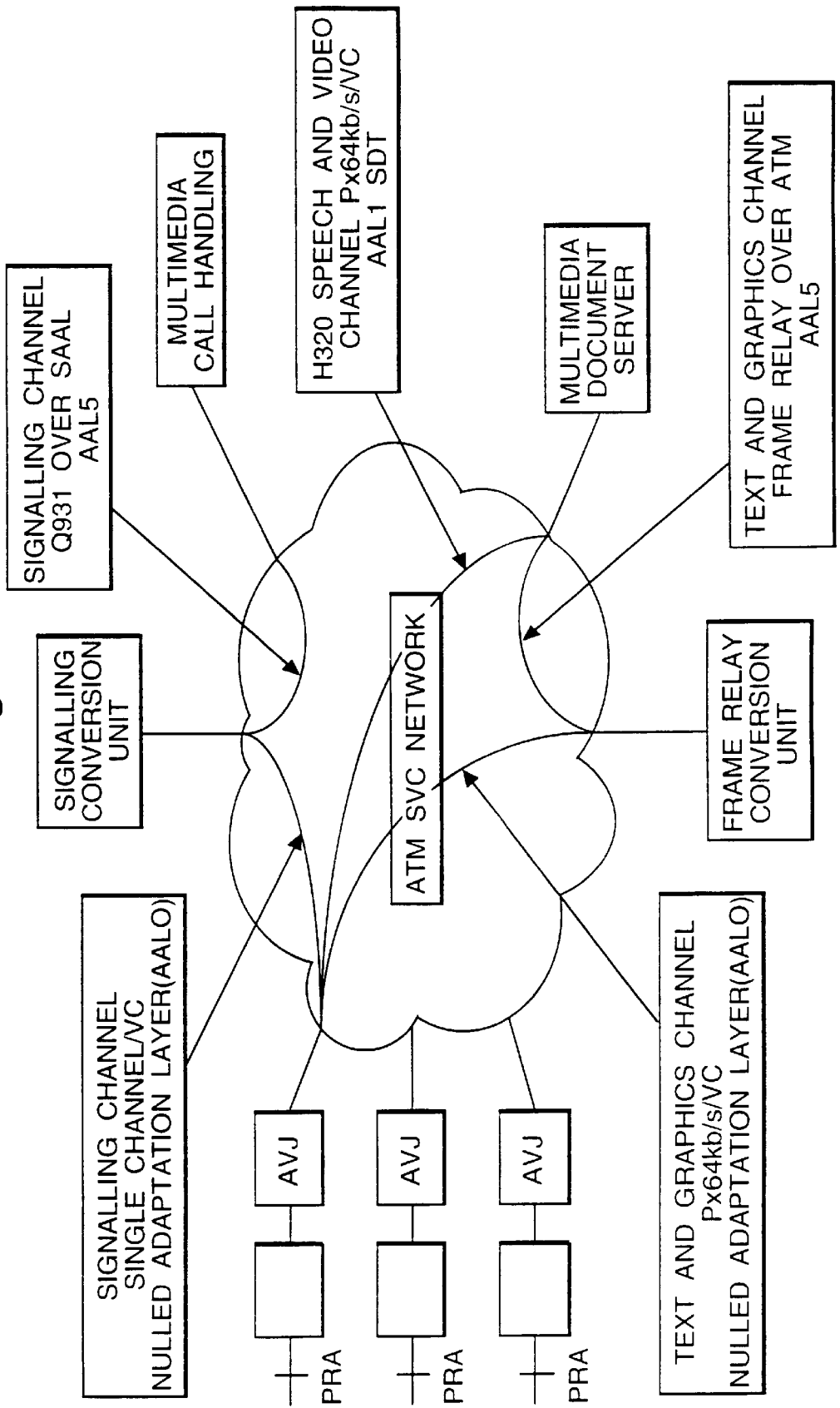
FIG. 6 illustrates the provision of multimedia document access in the network of FIG. 1.

The use of the above mechanisms to provide a multimedia document access service is illustrated in FIG. 6. This shows a number of ISDN primary access interfaces (PRA) connected into an ATM network via a number of AVJ devices. The AVJ has a mode of operation with no adaptation layer (AAL0) which it uses for data services which are protected by HDLC. This is used to effect a signalling channel connection for the D-Channel of the PRA to the signalling conversion unit which converts the LAP-D of the D-channel to SAAL and forwards the signalling messages as a cell stream to a control Processor acting as a multimedia call handling server. In the arrangement shown, the messages received indicate that the service required is to access a multimedia document server which will require two types of connection. A frame relay connection is required to access the text and graphics part of the multimedia document, this is made in two parts, a first connection part is made from the AVJ to the frame relay conversion unit, this carries a P×64 kb/s data stream using AAL0 and serves to separate the channels containing frame relay data from the other channels in the TDM multiplex, it transfers data without any awareness of the HDLC framing structure that it contains, the frame relay conversion unit identifies and terminates the HDLC frames and constructs an AAL5 VC which is the basis of the second connection part which provides the text and graphics connection to the Multimedia Document Server. The second connection is made directly to the document server and is a P×64 kb/s connection carrying an H320 narrow band connection which is a standard for narrow band Speech and Video. The AVJ converts this connection from its narrow band to its ATM form. This provides an open services architecture for narrow band services based on flexible signalling connections.

Figure 7:
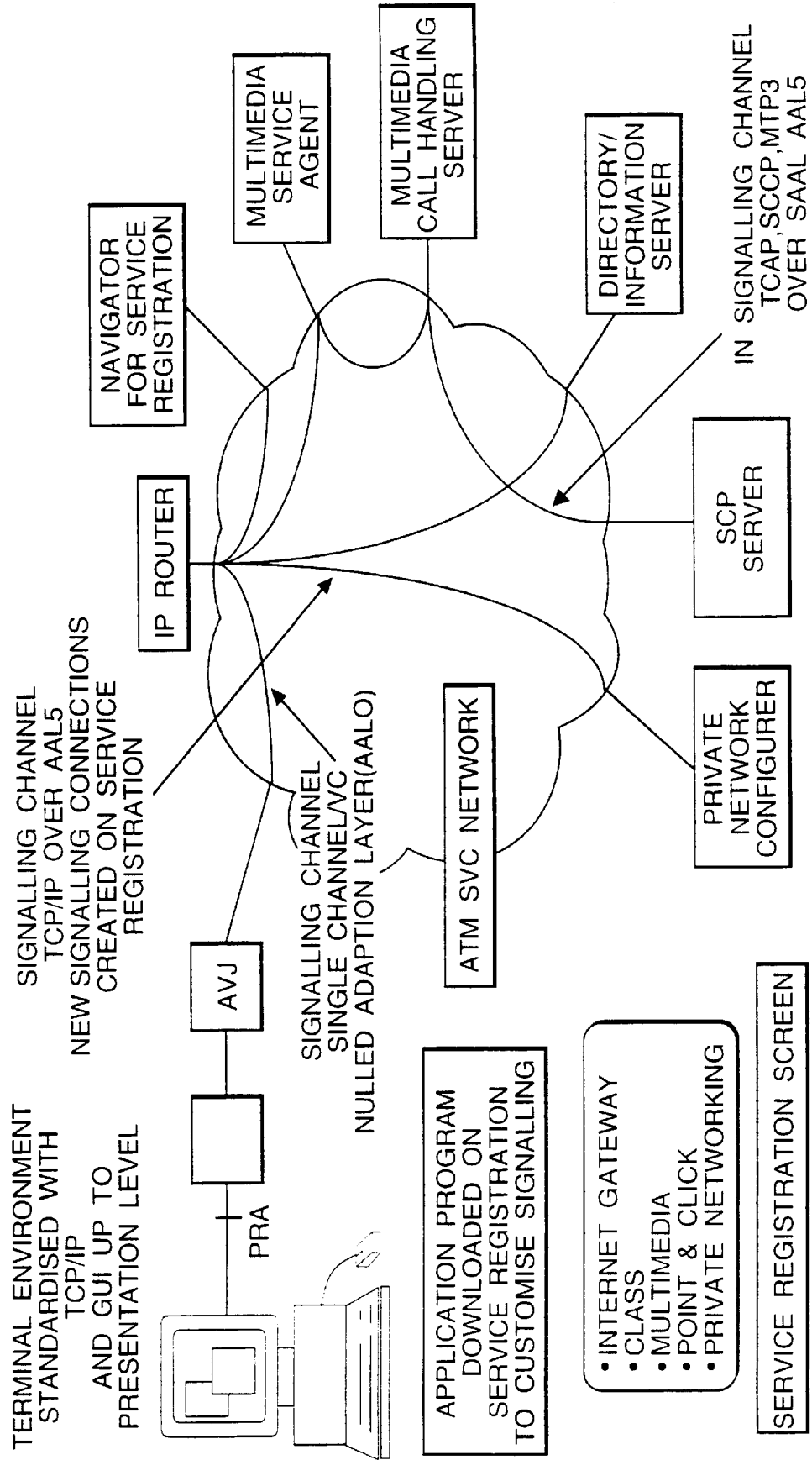
FIG. 7 illustrates an internet signalling arrangement for use with the network of FIG. 1.

The signalling system DSS1 of which Q931 is the layer 3 protocol is designed as a connection request interface which is fully standardised at this layer 3. In a Multimedia service network where multiple connections are made on a co-ordinated basis to provide a higher value service then it would be more effective to make high level service requests directly to a server rather than requiring the client terminal to specify each connection separately. In addition with Q931 being a fully specified standard at layer 3, it makes it difficult for the servers to customise the client terminals which is a very useful facility as it enables the servers to differentiate their services. These issues are resolved by using the Internet standard TCP/IP as a supplementary signalling system to the is ISDN Q931 signalling system. The Q931 system is preferred as the connection control signalling integrated into the ATM connectivity network. TCP/IP is carried as D-channel data so that the system is completely in compliance with ISDN standards, this being illustrated in FIG. 7. A Narrow band Multimedia terminal is shown which is standardised to the presentation layer with some de facto standard such as Windows. This communicates with the TCP/IP protocol over the ISDN D-Channel to an IP Router which provides flexible signalling connections to Servers on the ATM network. IP Routers are able to route individual data frames to different destinations so that the flexible signalling connection is established simply by providing the IP address of the server to the IP Router. TCP/IP can be used to download files to the multimedia terminal which can be used on registration with a server to download an application programme into the terminal in order to customise it for the particular type of service provided by the server. Illustrated in FIG. 7 are a number of typical servers and the means of registering the terminal in order to use them. The multimedia terminal is always registered on to a navigator for service registration. Whilst operating at this level the terminal is provided with a registration screen which indicates the service networks that are available for provision of services. Clicking on a service network identifier will cause the navigator to determine a server having available capacity and will make a signalling connection to that server which will result in an icon representing that server appearing on the terminal. Opening the icon will lead to a service request dialogue directly with the selected server. Servers illustrated are a private network configurer which will allow a network of leased lines to be reconfigured to suit different time of day traffic patterns within a private network, a directory/information server which will allow telephone calls to be placed by typing a name and selecting a name and address from a screen provided from the directory to automatically connect the call, and an intelligent network services control point (SCP) so that IN capabilities can be retained within an open services architecture. These are all possible services on an open services architecture but the service potential is not constrained as there are no restrictions that would prevent further capabilities being added.

Figure 8:
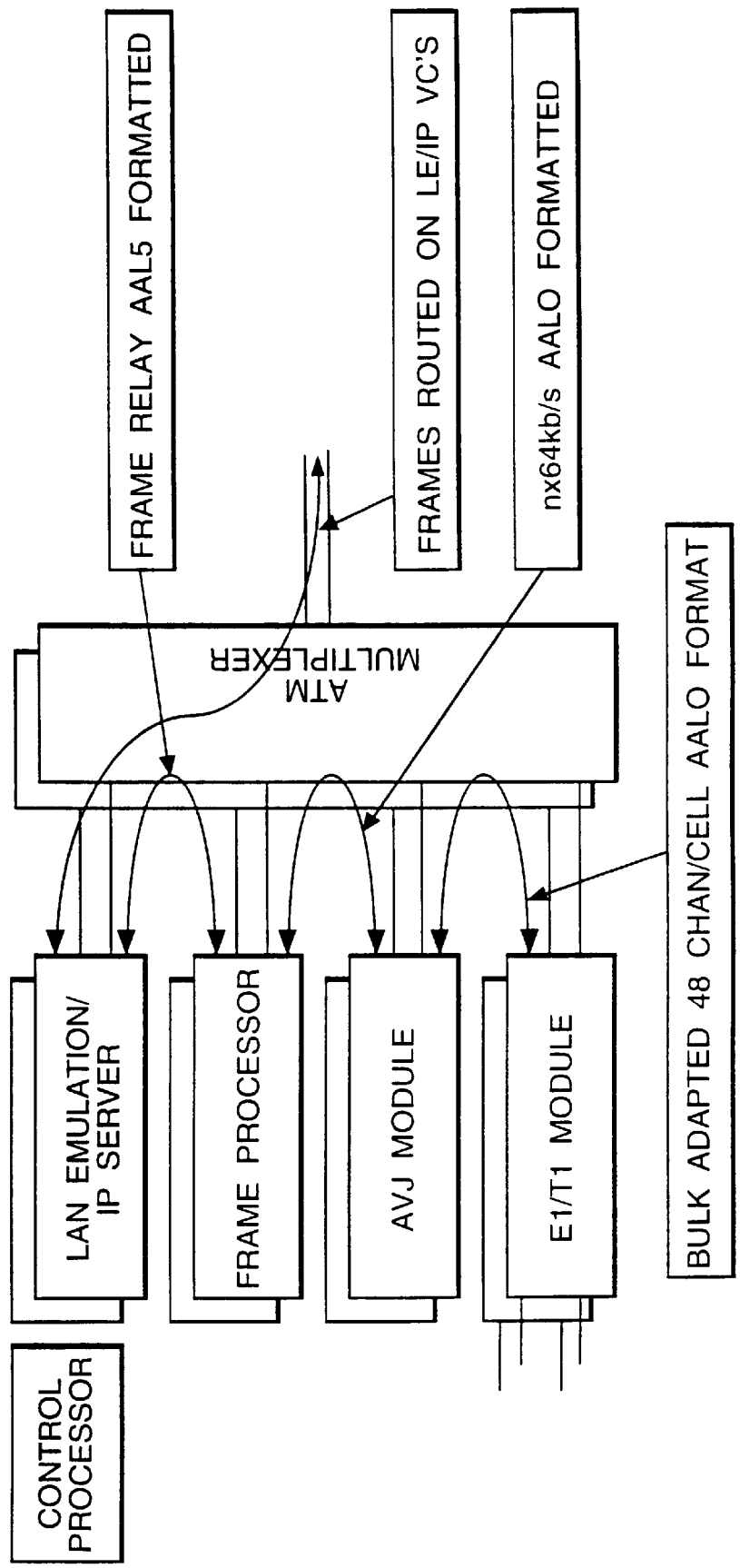
FIG. 8 illustrates an IP router for use with the signalling arrangement of FIG. 7.

An implementation of an IP router within the above system is illustrated in FIG. 8. The E1/T1 module terminates a number of digital trunk or ISDN PRA systems and adapts them to a form suitable for processing by the AVJ. In this case 48 channels are carried per cell with one cell per 125 microseconds and AAL0 adaptation layer. The AVJ extracts the signalling and data channels and establishes separate VCs for each one connected to the frame processor which is exactly similar to the Frame Relay Conversion Unit shown in FIG. 4. The frame processor terminates the HDLC and passes the data in an AAL5 cell stream to a standard ATM control processor. LAN emulation is a service specified by the ATM Forum which can be implemented in software and used to carry the IP data frames to the required destination; IP routing is openly available standard software.

Figure 9:
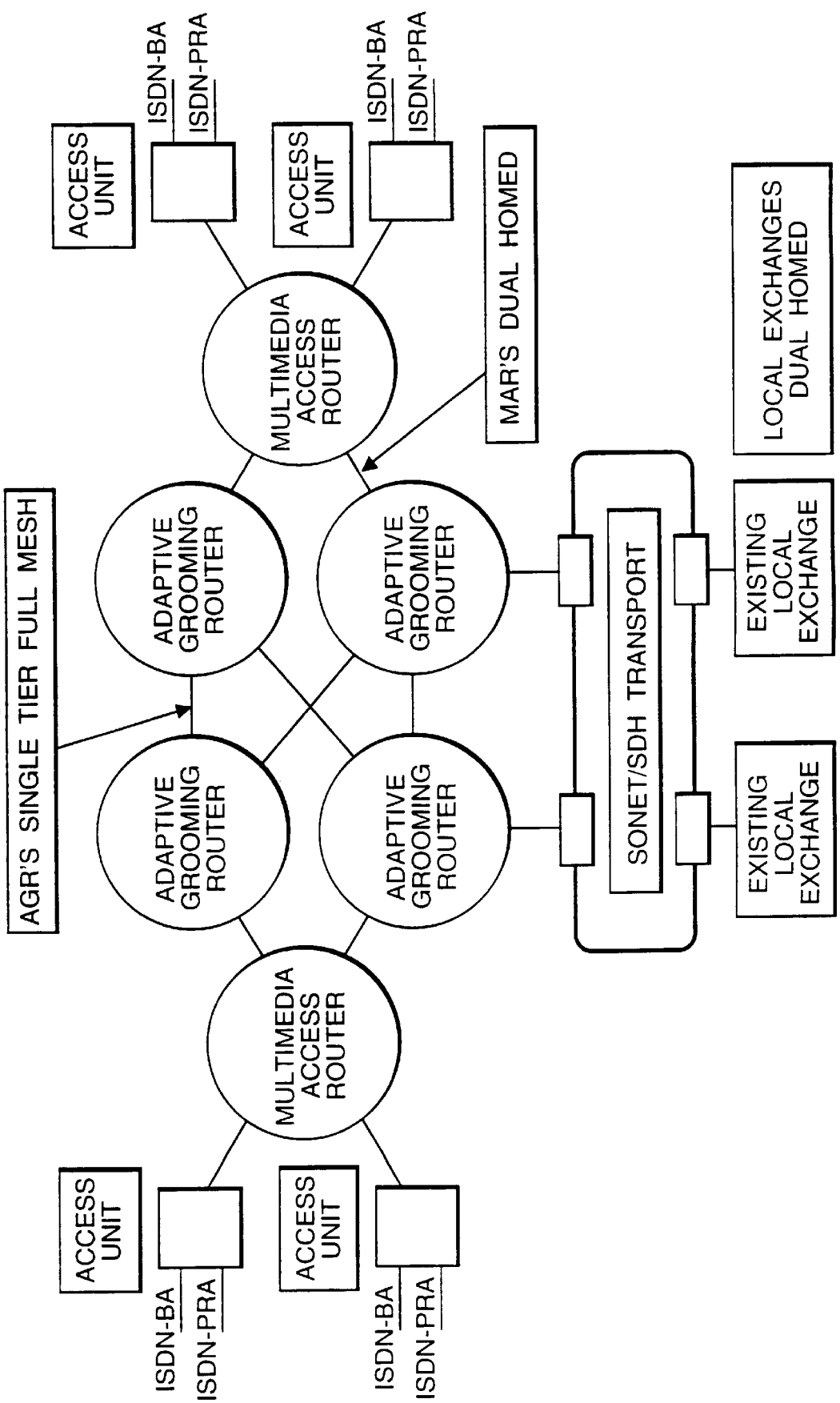
FIG. 9 illustrates a narrow band multimedia network architecture applied to the network of FIG. 1.

A narrow band multimedia network architecture based on these principles is shown in FIG. 9. A switching system based on the AVJ arrangement shown in FIG. 5 is termed an adaptive grooming router (AGR) and is illustrated here as forming a fully interconnected backbone network function which provides connectivity between a number of multimedia access routers (MAR) providing multimedia services and between these MAR's and the existing narrow band network. MAR's provide a hub point where access units which terminate the ISDN basic access and primary rate access lines used for multimedia service are terminated.

Figure 10:
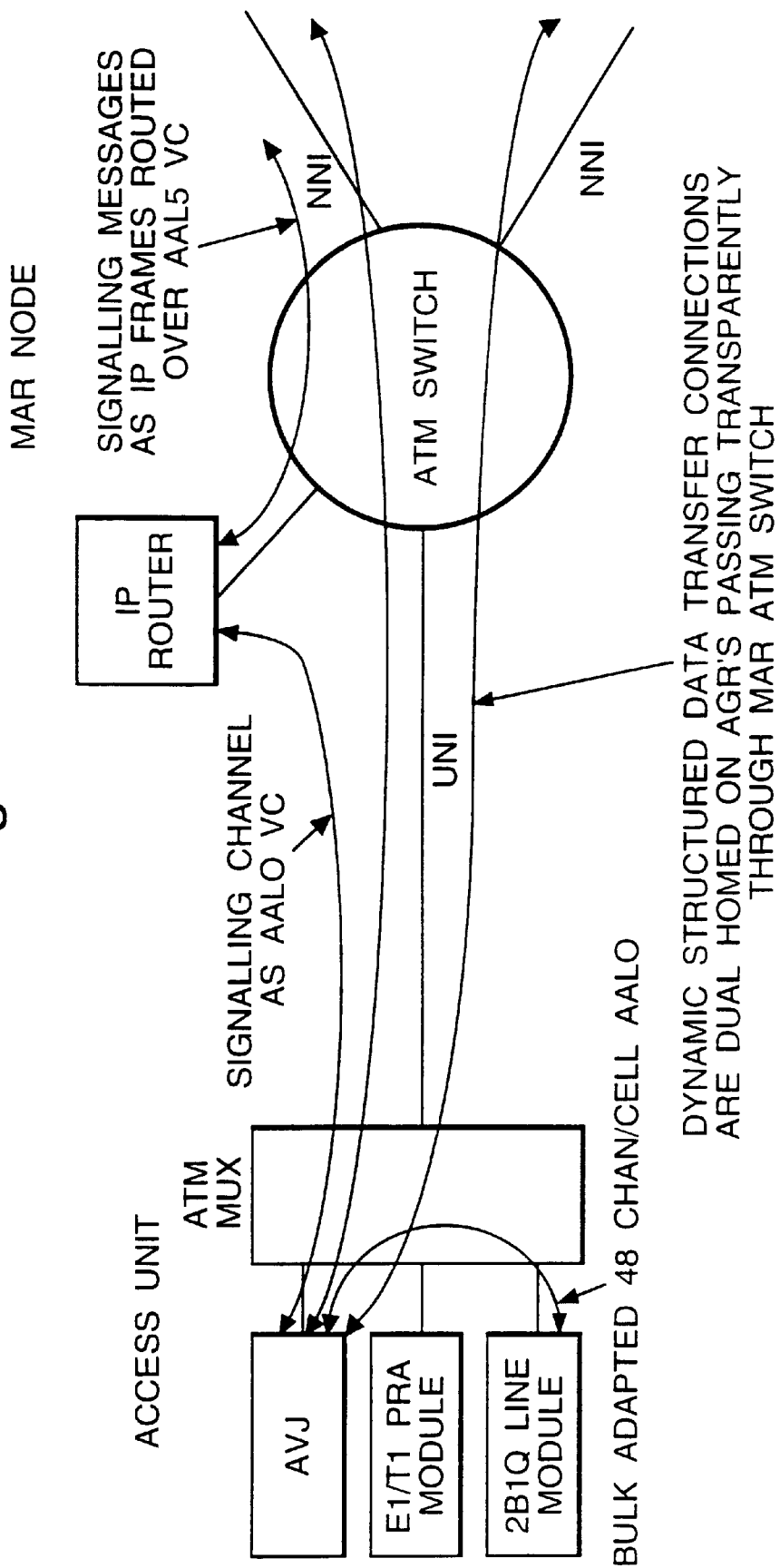
FIG. 10 shows a multimedia access router for use with the architecture of FIG. 9.

A possible implementation of a multimedia access router based on the above modular components is illustrated in FIG. 10. An access unit comprises modules for ISDN BA and PRA lines. These are connected to a co-located AVJ using a bulk adapted 48 channel per AAL0 VC. The AVJ separates out the signalling channels and connects these on individual AAL0 VCs to the IP router module in the MAR node. The IP router converts signalling messages into IP Frames which are routed to the associated servers as illustrated in FIG. 7. The narrow band 64 kb/s channels used for user traffic are aggregated into DSDT connections which are routed transparently through the ATM Switch in the MAR node and are terminated on AVJs within the associated AGRs. The MAR is thus able to make flexible signalling connections using its IP Router and to make traffic connections by inter working its AVJs with the AVJs of the associated AGRS.

The TINA Consortium has defined an open services architecture which emphasises the separation of Connection Control from Call Control, connections are made at the connection control layer by means of operations on a Network Resource Information Model. The diagram of FIG. 11 shows a control architecture which permits this separation of connection control from call control which may be achieved according to the TINA-Consortium concepts or by any other means.

Figure 11:
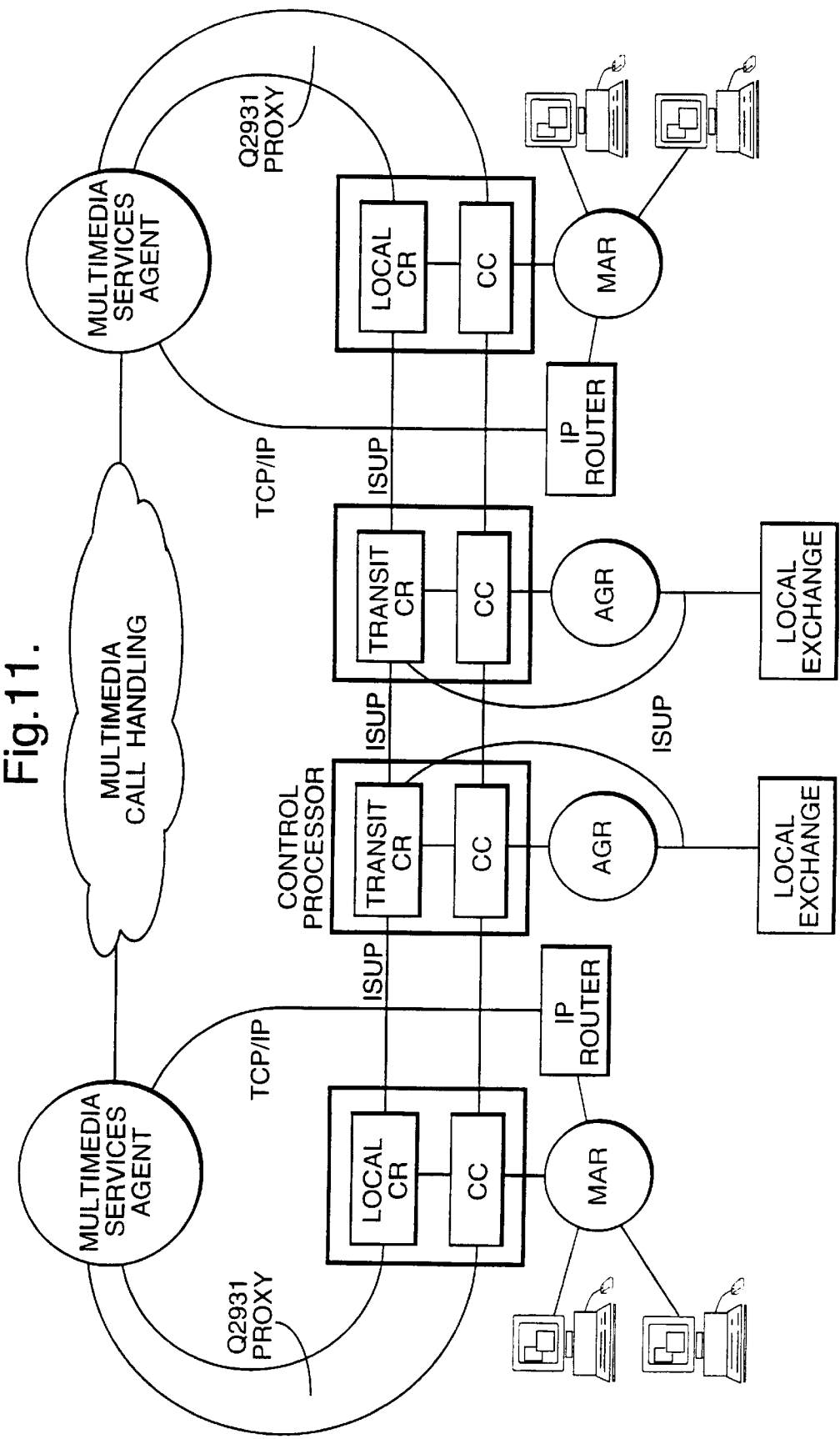
FIG. 11 is a schematic diagram of an open services architecture incorporated in the network of FIG. 1.

The open services architecture enabled by the system of flexible signalling connections is illustrated in FIG. 11. Multimedia Workstations are shown connected to Multimedia Access Routers, MAR's are connected to a network of Adaptive Grooming Routers to provide geographical scaling to the network, the AGRs in addition provide Call Routing capabilities to allow calls to be forwarded to the existing network. AGRs are provided with one or more Control Processors which provide Transit Call Routing based on SS7 signalling as well as Connection Control based on the TINA Consortium Network Resource Information Model or some other scheme. The scheme of flexible ignalling connections is as follows:

The signalling channels of the ISDN BA or PRA terminals are connected to an IP Router according to the mechanism of FIG. 10 and to the connection control of the adaptive grooming router using Q931 standard ISDN signalling.

On service registration a Multimedia Services Agent located on some arbitrary server will be allocated to the multimedia terminal using the mechanisms of FIG. 7. The IP address of the allocated agent will be passed to the Multimedia Workstation in order to enable routing via its IP Router.

Interaction between Multimedia Services Agents and Multimedia Call Handling may use any suitable available means as this is an open services architecture.

The Multimedia Services Agent may invoke connections between Multimedia Terminals as part of some complex multimedia call or it may invoke a Call Routing function in order to route a call to the existing narrow band network. These signalling connections are made to the MAR hosting the multimedia terminal using the Q2931 Proxy Signalling standard illustrated in FIG. 3.

Call Routing in MAR's and AGRs and between AGRs and the existing network use signalling connections as illustrated in FIG. 2.

As a result of all these signalling connections it is possible for a Multimedia Call Handling system running on Open ATM Control Processors to establish calls between multimedia terminals utilising any number and type of connections supported by the terminals and in addition to route calls of normal telephony types to the existing narrow band network.

What is claimed is:

1. An open services communications network architecture for inter-working narrow band services with broad band services in an asynchronous transfer mode (ATM) network so as to deliver multimedia services to users served by the communications network, the network architecture comprising an ATM core network, a multimedia call server, one or more multimedia servers, and a plurality of adaptive virtual junctors at the edge of the core network, said adaptive virtual junctors being interconnected by a mesh of permanent virtual connections each capable of supporting a plurality of narrow band channels and each having an adjustable capacity, wherein each adaptive virtual junctor is arranged to set up a multimedia session for a user via a signalling message relayed to the call server so as to establish first and second narrow band communication channels between that user and said one or two multimedia servers, each said communication channel being established within a said permanent virtual connection wherein said first communications channel is a text and graphics channel, and said second communications channel is speech and video channel.

2. An open services communications network architecture as claimed in claim 1, wherein each said multimedia access router incorporates an access unit comprising modules for ISDN BA and PRA lines connected to an adaptive virtual junctor (AVJ), and wherein the adaptive virtual junctor is arranged to separate out signalling channels for connection to the router whereby to access corresponding service agents.

3. An open services communications network architecture as claimed in claim 2, and incorporating means for effecting proxy signalling.

4. An open services communications network architecture as claimed in claim 3, and having separate connection control and call control functions.

5. An open services communications network architecture as claimed in claim 1, wherein said second communications channel supports a frame relay connection.

6. An open services communications network architecture as claimed in claim 5, wherein said frame relay connection comprises a first part established between the adaptive virtual junctor and a frame relay conversion unit, and a second part established between the frame relay conversion unit and the multimedia server.

7. An open services communications network architecture as claimed in claim 6, and incorporating means for effecting proxy signalling.

8. A method of inter-working narrow band services with broad band services in an open services communications network architecture incorporating an asynchronous transfer mode (ATM) network so as to deliver multimedia services from one or more multimedia servers to users served by the communications network, the network architecture comprising an ATM core network, a multimedia call server, one or more multimedia servers, and a plurality of adaptive virtual junctors at the edge of the core network, said adaptive virtual junctors being interconnected by a mesh of permanent virtual connections each capable of supporting a plurality of narrow band channels and each having an adjustable capacity, wherein the method comprises; sending a signalling message to the call server indicating a multimedia server to be accessed, establishing a first narrow band communications channel within a permanent virtual connection between the multimedia server and a user, and establishing a second narrow band communications channel within a permanent virtual connection between the multimedia server and the user so as to set up a multimedia session for that user wherein said first communications channel is a text and graphics channel, and said second communications channel is a speech and video channel.

9. A method as claimed in claim 8, wherein said second communications channel supports a frame relay connection.

10. A method as claimed in claim 9, wherein said frame relay connection comprises a first part established between the adaptive virtual junctor and a frame relay conversion unit, and a second part established between the frame relay conversion unit and the multimedia server.

11. A method as claimed in claim 10, wherein connection control and call control are separated.

12. A method as claimed in claim 11, wherein signalling is effected as a messge stream over the ATM network as an ATM adaptation layer five (AAL5) virtual connection.

* * * * *